Aug. 16, 1949.　　　M. W. GROSS　　　2,478,968
SAFETY CATCH FOR PIN STEMS
Filed Aug. 31, 1948

INVENTOR.
Marshall W. Gross
BY
Barlow & Barlow
Attorneys

Patented Aug. 16, 1949

2,478,968

UNITED STATES PATENT OFFICE 2,478,968

SAFETY CATCH FOR PIN STEMS

Marshall W. Gross, Attleboro, Mass.

Application August 31, 1948, Serial No. 47,012

8 Claims. (Cl. 24—157)

This invention relates to a pin stem and more particularly to the safety catch for retaining the pin stem in clasped position.

Pin stems heretofore have been provided of varying constructions, many of which rotate a keeper within a post to hold the pin stem within an opening in the keeper. A tension usually is provided on the pin stem and this tension is depended upon to so friction the keeper that it will not rotate in its mounting to allow the pin stem to escape. Usually the rotatably mounted keeper requires a rotation through more than 180° in order that the pin stem may be allowed to escape. Thus, with the friction of the pin stem on the keeper, the likelihood of a rotation through this extent is very remote. In some cases, a handle on the keeper is so arranged that it will engage the fabric on which the pin stem is positioned so that likelihood of escape or movement of the keeper to a position to allow the pin stem to escape is unlikely.

One of the objects of this invention is to provide a safety catch in which there is a rotatably mounted keeper, but this keeper normally is not engaged by the pin stem when in locked position.

Another object of this invention is to provide a clasp for a pin stem and a safety lock so that the pin stem will be in clasped position in a part which is fixed with reference to the mounting and relatively fixed with reference to the pin stem so that there will be no opportunity for movement of the clasp for the pin stem; thus, regardless of the keeper which provides a safety lock for the clasp, the pin stem cannot escape.

Another object of this invention is to provide an arrangement which will hold the pin stem in locked position by its own tension with the keeper serving merely to deliver the pin stem from an entrance mouth to the clasped position and also serving to block the pin stem from removal from such clasped position.

Another object of this invention is to provide a keeper which will have a relatively narrow gap through which the pin stem may be positioned with this gap out of line with the pin stem when the keeper is moved to a locked position.

With these and other objects in view, the invention consists of certain novel features of construction, as will be more fully described and particularly pointed out in the appended claims.

Figure 1:
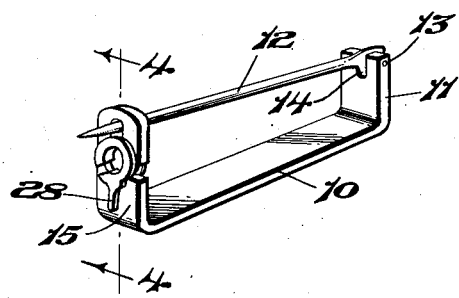
Figure 1 is a perspective view of a pin stem and safety catch for locking the pin stem in position.

In proceeding with this invention, I provide a pin stem which will be pivotally or hingedly mounted and a post at a location where it is desired that the pin stem shall be clasped. This post is suitably slotted or recessed or provided with openings so that the pin stem may pass through an entrance mouth or slot into a circular opening and thence into a notch extending outwardly from the circular opening which position it tends to move to by reason of the bending or tension on the pin stem by reason of its mounting.

I provide a keeper in this circular opening through which the pin stem passes in moving to locked position, which is provided with a gap for movement of the pin stem through the gap and through the entrance slot after which, movement of the keeper will transfer this gap to registry with the notch and thus permit the pin stem to move into the notch. Further movement of the keeper will provide a block of the opening to the notch so that the pin stem cannot escape. The keeper thus serves to deliver the pin stem from its entrance slot to the notch where finally it rests, and under tension by reason of its mounting in a relatively fixed part which cannot be adjusted or moved to permit escape of the pin stem.

With reference to the drawings, I provide a bar 10 which is bent up at one end 11 to provide a hinge mounting for a pin stem 12. This pin stem is pivoted by means of a pivot pin 13 and is provided with a usual lug 14 so that it will have to be bent or tensioned downwardly in order for it to enter the clasped portion of the device, thus providing a tension of the pin stem tending to move the pin stem upwardly or swing the same about its pivot 13 when it is in clasped position.

Figure 5:
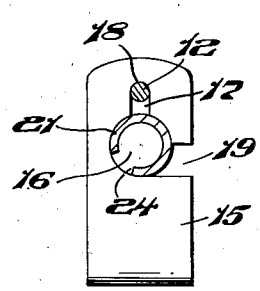
Figure 5 is a sectional view at substantially the location of Figure 4, but at right angles thereto.

At the opposite end of the bar 10 a post 15 extends upwardly which as best shown in Figure 5 is provided with a circular opening 16 extending therethrough. A notch 17 extends upwardly from this opening 16 and is of a size and extent to receive the pin stem 12 therein. This notch is closed at its upper end as at 18 so that after the pin stem is in the notch, it cannot escape therefrom. The inherent tension on the pin stem 12 also serves to move the same outwardly to maintain the pin stem in this notch. The notch 17 is in a location so that swinging movement of the pin stem about its pivot 13 will be in a path so that the pin stem will tend to move into this notch. An entrance slot 19 extends outwardly from the opening 16 so that the pin stem 12 may readily pass through the entrance opening 19 and move through the bearing opening 16 into the notch. This structure would serve to retain the pin stem in position as a catch, but would not lock the pin stem against movement out of this position.

In order to lock the pin stem in position, I have provided a keeper which I designate generally 20 and which consists of a member which will have a bearing in the opening 16. Thus there is provided a cylindrical portion 21 which is rotatably mounted in the circular opening 16 and in order that this may be retained in this opening, I provide an inner flange 22 and an outer flange 23, which flanges extend over the opposite surfaces of the post and serve as heads to prevent the keeper 20 from escaping from its bearing opening 16. This keeper has a gap 24 extending radially outwardly through the cylindrical portion 21 and its flanges 22 and 23. This gap is of a width to receive the pin stem therethrough. One edge of this gap 25 extends outwardly beyond the flange 23 in the portion 26 so as to cross the path of the notch 17 and be of sufficient extent to engage the pin stem when located in this notch 17. Thus, this edge or surface of the gap serves to align the gap with the notch when the pin stem is in the notch so that it will be a simple matter to align the notch and gap for removing the pin stem from the notch, the step next being to then position the pin stem within the opening through the keeper and then move the keeper to align the gap with the entrance opening 19 and thus remove the pin stem through the aligned gap and opening for removing it from its clasped position.

Figure 2:
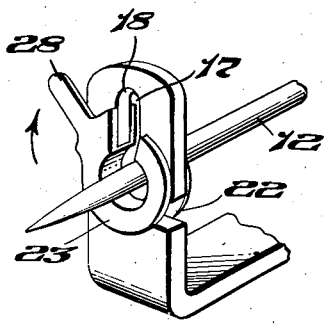
Figure 2 is a fragmental perspective view of the parts shown in Figure 1, but illustrating the keeper as in a position for release of the pin stem from the locked position shown in Figure 1.
Figure 3:
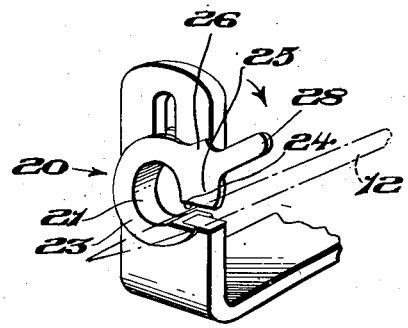
Figure 3 is a view similar to Figure 2 but illustrating the keeper as rotated to another position and in a position for the movement of the pin stem to or from the opening through the keeper.
Figure 4:
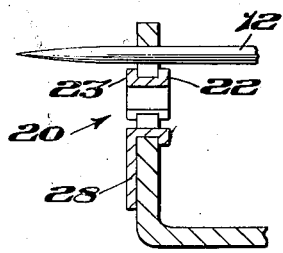
Figure 4 is a sectional view on line 4—4 of Figure 1.

Reversely, if it is desired to place the pin stem in clasped position, it is necessary to align the gap of the keeper and the entrance opening 19, as shown in Figure 3, then pass the pin stem through these parts into the open cylindrical portion 21 of the keeper, then move the keeper to the position shown in Figure 2, after which, the pin stem by reason of the tension on it will move into the notch 17 which is its locked position. After the pin stem has moved into this position, the keeper is moved further in its rotation to the position shown in Figure 1, or Figure 4, where the pin stem thus becomes locked in the notch by reason of the outer surface of the flanges 22 and 23.

A handle 28 is positioned on the keeper adjacent the surface 25 which is found to be a convenient location for the handle in that the handle may then be located as shown in Figure 1 at a point diametrically opposite from the notch when the pin stem is in a desired clasped position, while the handle is also conveniently located for other operating positions of the keeper.

I claim:

1. A safety catch for a pin stem comprising a post provided with a circular bearing opening therein and a radial notch closed at its end and of a size to receive a pin stem extending outwardly from the opening at one location and an entrance slot from the opening through the side of the post for the passage of a pin stem therethrough at another location angularly spaced from the notch, a keeper rotatably mounted in said bearing opening having an open center and a radial gap through the keeper of a size sufficient to pass a pin stem, said gap being adapted to align with said slot at one position of rotation and with said notch at another position of rotation and out of registry with either at other positions of rotation of the keeper.

2. A safety catch as in claim 1 wherein the keeper has one edge of said gap extending outwardly sufficient to swing across the path of a pin when in said notch to engage the same.

3. A safety catch as in claim 1 wherein a handle on the keeper extends radially outwardly therefrom.

4. A safety catch as in claim 1 wherein the keeper has one edge of said gap extending outwardly sufficient to swing across the path of a pin when in said notch to engage the same, and a handle on the keeper adjacent the edge of said gap.

5. In combination a hingedly mounted pin stem, a safety catch having a post provided with a circular bearing opening therein and a radial notch of a size to receive a pin stem extending outwardly from the opening at one location in the path of movement of the pin stem when swung on its hinge mounting and closed at its end distant from said opening, and an entrance slot from the opening through the side of the post for the passage of the pin stem therethrough and at a location angularly spaced from the notch, a keeper rotatably mounted in said bearing opening having an open center and a radial gap through the keeper of a size sufficient to pass a pin stem, said gap being adapted to align said slot at one position of rotation to pass the pin stem therethrough and to align with said notch in another position to permit the pin stem to move into the notch, said pin being locked in the notch by further rotation of the pin stem.

6. The combination of claim 5 wherein the pin stem is so mounted as to be under tension when in the opening on the keeper so as to be urged to pass radially outwardly through the said gap and into said notch when the two register.

7. The combination of claim 5 wherein the keeper has an edge of the gap extending outwardly sufficiently to engage the pin stem when located in the notch and align the gap with the notch for the passage of the pin stem therethrough.

8. The combination of claim 5 wherein the keeper has an edge of the gap extending outwardly sufficiently to engage the pin stem when located in the notch and align the gap with the notch for the passage of the pin stem therethrough, said keeper being provided with a handle adjacent the said edge of the gap.

MARSHALL W. GROSS.

REFERENCES CITED

The following references are of record in the file of this patent:

UNITED STATES PATENTS

| Number | Name | Date |
| --- | --- | --- |
| 740,648 | Heaton | Oct. 6, 1903 |